Sept. 6, 1966 N. L. BROWN 3,271,694

VARIABLE FREQUENCY PHASE SHIFT OSCILLATOR

Filed Aug. 15, 1963 2 Sheets-Sheet 1

INVENTOR:
Neil L. Brown

By Smyth, Roston & Pavitt
Attorneys

VARIABLE FREQUENCY PHASE SHIFT OSCILLATOR

Filed Aug. 15, 1963 2 Sheets-Sheet 2

INVENTOR:
Neil L. Brown
By Smyth, Roston & Pavitt
Attorneys

United States Patent Office 3,271,694

Patented Sept. 6, 1966

3,271,694
VARIABLE FREQUENCY PHASE SHIFT OSCILLATOR

Neil L. Brown, El Cajon, Calif., assignor to The Bissett-Berman Corporation, Santa Monica, Calif., a corporation of California Filed Aug. 15, 1963, Ser. No. 302,351
14 Claims. (Cl. 331—66)

The present invention relates to oscillators and more particularly to so-called phase shift oscillators.

Very frequently, it is desirable to provide variable frequency oscillators that are capable of operating over a wide range of frequencies but will be very stable in all portions of the range. For example, in some types of measuring systems, a transducer is provided which is effective to sense a physical quantity and produce an electrical effect that will control the frequency of an oscillator. The frequency of the oscillator will then be a function of the physical characteristic being measured. However, if the oscillator is unstable, that is, its frequency varies or drifts as a result of factors other than the characteristic of the transducer, the frequency of the oscillator will not be an accurate indication of the magnitude of the physical quantity. Heretofore, numerous attempts have been made to provide oscillators which are extremely stable and will maintain a frequency which will be determined solely by the electrical characteristics of a pickup transducer. Although such oscillators have been somewhat successful, they have been subject to certain unstabilizing effects and, as a consequence, their frequency tends to drift, thereby limiting the accuracies of the readings which can be obtained.

It is now proposed to provide an oscillator which will overcome the foregoing difficulties. More particularly, it is proposed to provide an oscillator which will operate at a frequency that is determined by the electrical characteristics of a pickup transducer and is extremely stable in its operation and whereby the frequency at which it is running will be an accurate and reliable indication of the electrical characteristics of the pickup transducer.

These and other features and advantages of the present invention will become readily apparent from the following detailed description of one embodiment thereof, particularly when taken in connection with the accompanying drawings, wherein.

Figure 1:
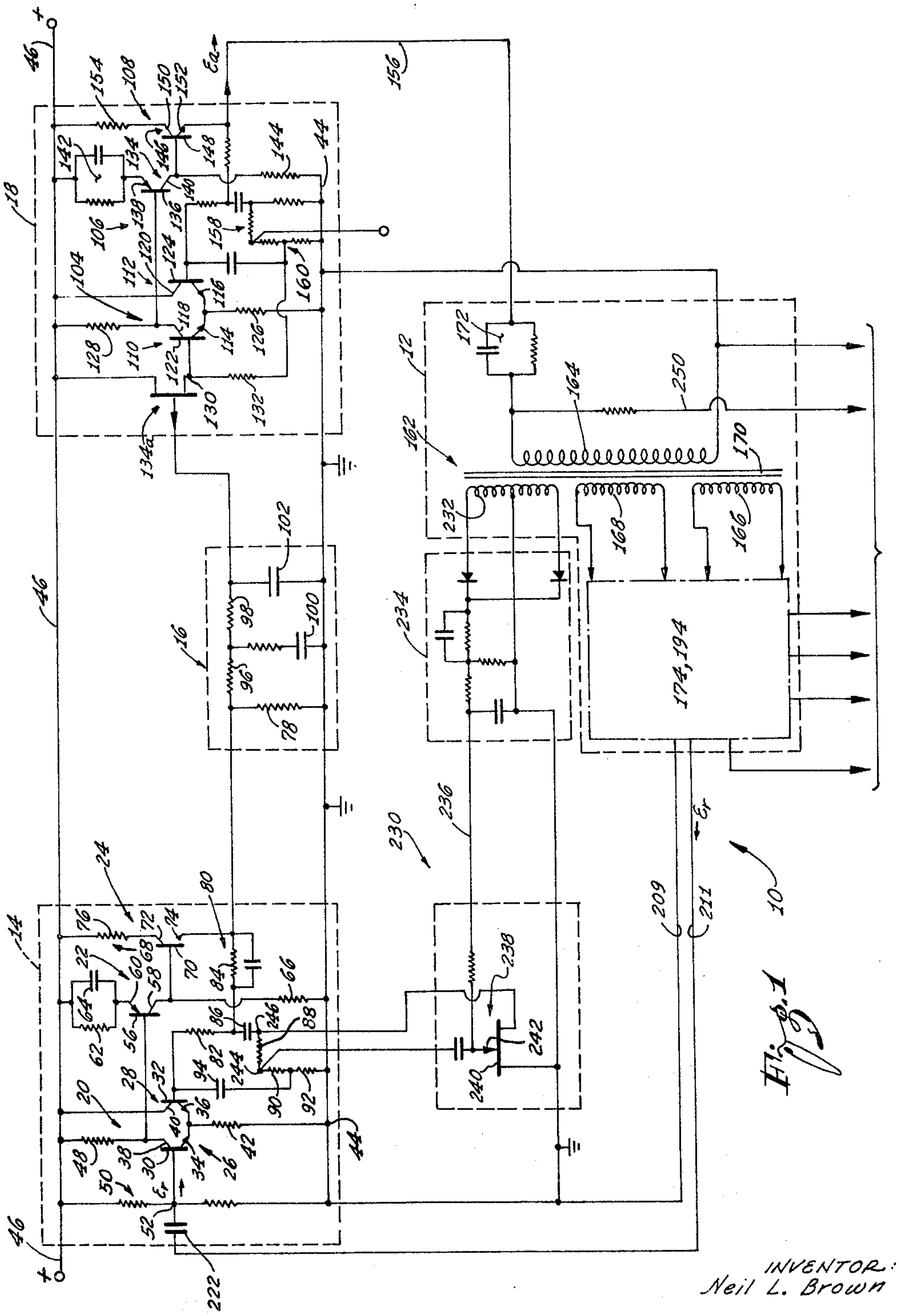
FIGURE 1 is a wiring diagram of an operative oscillator embodying one form of the present invention.
Figure 2:
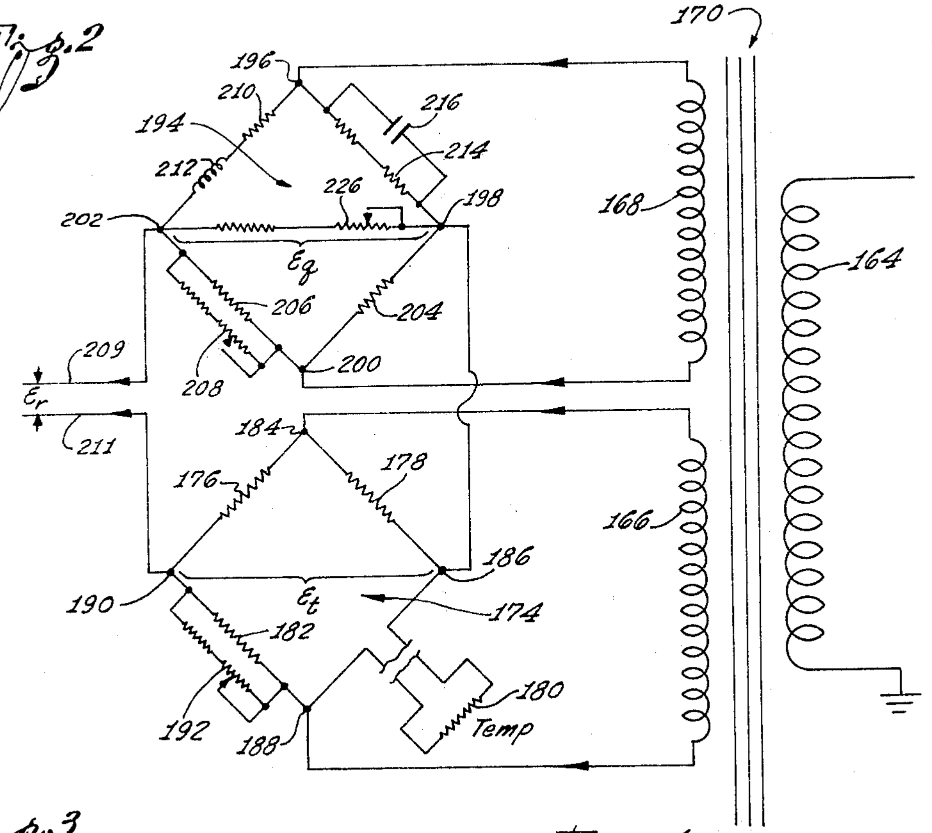
FIGURE 2 is a wiring diagram, on an enlarged scale, of a portion of the oscillator of FIGURE 1.

Referring to the drawings in more detail, and particularly to FIGURE 1, the present invention is particularly adapted to be embodied in a very stable oscillator 10. Although the oscillator 10 may be of a constant frequency variety, in the present instance, it is a so-called variable frequency oscillator effective to oscillate over a wide range of frequencies. More particularly it is adapted for use in a measuring system wherein the frequency at which the oscillator 10 is running is a function of the magnitude of a physical quantity to be measured. Accordingly, the oscillator 10 may include a transducer such as a temperature pickup, a pressure pickup, etc., which may be disposed in intimate relationship with some predetermined physical effect. An electrical characteristic of the transducer such as its resistance will vary in accordance with the magnitude of the physical effect and thereby control the frequency at which the oscillator 10 operates.

The present oscillator 10 is of the so-called phase shift variety and includes a sensor circuit 12 having the pickup transducer therein so as to provide an electrical effect related to a physical quantity being measured, a first amplifier 14 that is connected to the sensor circuit 12 so as to amplify an electrical signal resulting from the electrical effects produced by the transducer, a phase shifter 16 connected to the output of the amplifier 14 for phase shifting the amplified signal, a second amplifier 18 for amplifying the phase shifted signal, and means for interconnecting the output of the second amplifier 18 with the sensor circuit 12. It will thus be seen that the sensor circuit 12, the amplifiers 14 and 18 and the phase shifter 16 form a closed loop whereby a signal may continuously circulate therearound.

The first amplifier 14 may be of any desired variety capable of amplifying an electrical signal to a more useful level. It is highly desirable that the amplifier 14 be very stable and have uniform characteristics throughout its entire operating range. In the present instance, the amplifier 14 includes three separate stages 20, 22 and 24 that are all cascaded with each other. The first stage 20 is a so-called differential amplifier having a pair of electrically paralleled transistors 26 and 28. These transistors 26 and 28 are substantially identical and include bases 30 and 32, emitters 34 and 36 and collectors 38 and 40.

The emitters 34 and 36 in each transistor 26 and 28 are connected directly to each other and to one end of a common resistor 42. The opposite end of the resistor 42 leads to an electrical ground 44. This resistor 42, among other things, will tend to stabilize the currents through both of the transistors 26 and 28.

The collector 38 of the first transistor 26 is connected to a positive supply line 46 by a load resistor 48 while the collector 40 of the second transistor 28 leads directly to the supply line 46.

The base 30 of the first transistor 26 is connected to the midpoint in a resistive voltage divider network 50 extending from the positive supply line 46 to ground 44. This network 50 will be effective to maintain the base 30 at some predetermined reference bias level. The midpoint 52 will also serve as the input to the amplifier 14. The two transistors 26 and 28 will thus act as a differential amplifier so that the voltage across the load resistor 48 will be an amplification of the difference between the potentials on the two bases 30 and 32.

The second stage 22 includes a transistor 54 having a base 56, a collector 58 and an emitter 60. The base 56 is connected directly to the collector 38 of the first transistor 26. As a consequence, the signal amplified in the differential amplifier 20 will be fed to the transistor 54 in the second stage 22. The emitter 60 is connected to the positive supply line 46 by means of an RC circuit having a resistor 62 and an emitter bypass condenser 64. The collector 58 is connected to ground by means of a collector load resistor 66. It may thus be seen that the amplified signal will appear across the load resistor 66.

The third stage 24 includes a transistor 68 having a base 70, a collector 72 and an emitter 74. The base 70 is connected directly to the collector 58 so as to receive the amplified signal across the load resistor 66. The collector 72 is connected to the positive supply line 46 by a current limiting resistor 76. The purpose of this resistor 76 is to limit the maximum collector current possible through the transistor 68 to a safe level even though the emitter 74 is accidentally grounded.

The emitter 74 is connected to ground by a suitable load resistor 78 so that the amplified signal will appear across the resistor 78. It will thus be seen that the final transistor 68 in the third stage 24 will operate as an emitter follower so as to produce an amplified signal across the load resistor 78. At the same time, this stage 24 will be effective to match the output impedance of the amplifier 14 to the input impedance of the phase shifter 16. It should be noted that the load resistor 78 may be disposed inside of the amplifier 14 or, if desired, it may be located at the input to the phase shifter 16, substantially as shown in the present embodiment.

Although the base 32 of the second transistor 28 may be maintained at a fixed reference level, it has been found desirable to feed back a portion of the amplified signal to the base 32 so as to stabilize the amplifier 14. Accordingly, in the present instance, a feedback network 80 is provided that extends from the junction between the resistor 78 and the emitter 74 to the base 32 of the second transistor 28 in the differential amplifier 20. This will be effective to feed a portion of the amplified ouput signal back to the second side of the differential amplifier 20. The signal fed back to the second side of the amplifier 20 will be in phase with the signal in the first side. As a consequence, the feedback will be degenerative and tend to stabilize the amplifier 14.

In the present instance, the feedback network 80 includes a pair of resistors 82 and 84 which are connected in series and extend directly from the emitter 74 to the base 32. This will form a direct current or D.C. path that will be effective to maintain the base 32 of the transistor 28 and emitter 74 of the transistor 68 at identical D.C. potentials at all times.

In addition, the feedback network 80 may also include a condenser 86 and a series of resistors 88, 90 and 92. The condenser 86 and resistors 88, 90 and 92 are all connected in series and extend from the junction between resistors 82 and 84 to ground. A bypass condenser 94 is also provided that extends from the base 32 to the junction between resistors 90 and 92.

It will thus be seen that although the emitter 74 and base 32 are maintained at substantially identical D.C. levels, the condenser 94 will couple only the portion of the A.C. signal across the resistor 92 to the base 32. As a consequence, the feedback network 80 will act as a voltage divider so that only a limited portion of the A.C. signal will be fed back to the base 32. The magnitude of this portion will be determined by the relation of the resistance of the resistor 92 to the total effective resistance of the resistors 88, 90 and 92. The amount of feedback will normally be in the general range of about 40 db. This high or large amount of feedback will be effective to stabilize the amplifier 14 and virtually eliminate any drifting of the phase shift or other characteristics in the amplifier 14. As a consequence, the entire amplifier 14 will have a very high degree of phase and frequency stability.

The output from the amplifier 14 will thus be formed by the load resistor 78 and the output signal will be the voltage across the resistor 78. This voltage or signal will comprise an alternating voltage which, as will be seen, will have a frequency corresponding to the resonant frequency of the oscillator 10. Since the amplifier 14 is very linear and stable over the entire frequency range, there will be no phase shifting or at least a constant phase shifting of the signal passing through the amplifier 14. As a result, the phase of the signal from the amplifier 14 will be determined by the phase of the signal derived from the sensor unit 12.

The phase shifter 16 is interconnected with the load 78 for the emitter 74 and may be of any desired variety. In the present instance, it is a so called "pi" or "ladder" network consisting of a plurality of serially connected resistors 96 and 98 and a plurality of parallel connected condensers 100 and 102.

It may be seen that the signals passing through this network 16 will appear across the output condenser 102. The phase of the signal across the condenser 102 will be shifted from the phase of the signal across the resistor 78. The amount of phase shift will be controlled by the relative reactances of the various condensers 100 and 102 to the resistances of the resistors 96 and 98. Although the resistances will remain constant, the reactances will vary as a function of the frequency of the signals in the network 16. It may thus be seen that the phase of the signals out of the network 16 will vary as the frequency varies.

The output from the phase shifter 16 is interconnected with the input to the second amplifier 18 so as to transfer the phase shifted signal into the amplifier 18 for further amplification. Although this amplifier 18 may be of any desired variety, in the present instance, it is very similar to the first amplifier 14 and possesses the same degree of linearity and stability.

More particularly, the amplifier 18 includes three separate stages 104, 106 and 108 that are all cascaded together. The first stage 104 is a so-called differential amplifier having a pair of transistors 110 and 112, each of which includes an emitter 114 and 116, a collector 118 and 120 and a base 122 and 124. The emitters 114 and 116 are connected directly to each other and to a common resistor 126 that leads to ground 44. The first collector 118 is connected to the positive supply line 46 by a load resistor 128 while the second collector 120 is connected directly to the supply line 116. The base 122 is connected to the midpoint 130 in a resistive voltage divider which extends from the positive supply line 46. The voltage divider includes a fixed resistor 132 and a field effect transistor 134*a*. The gate of the field effect transistor is connected to the output of the phase shifter network 16 so that the A.C. signal from the phase shifter will be coupled directly onto the base 122 of the transistor 110. Any D.C. components coupled from the emitter 74 of the transistor 68 through the phase shifter 16 will be effective to vary the resistance of the field effect transistor 134*a* relative to the resistance of the resistor 132. This, in turn, will cause the bias potential at the base 122 to be maintained at a level that will insure the two amplifiers 14 and 18 being properly balanced against each other.

The second stage 106 includes a transistor 134 having a base 136, emitter 138 and collector 140. The base 136 is connected directly to the collector 118 of the first transistor 110 in the differential amplifier 104 so as to receive the amplified signal therefrom.

The emitter 138 is connected to the positive supply line 46 by means of an RC circuit 142 having a resistor and an emitter bypass condenser. The collector 140 is connected to the ground conductor 44 by means of a load resistor 144. It will thus be seen that the amplified signal across the collector load resistor 128 will be carried directly to the base 136 of the transistor 134 and will appear across the collector load resistor 144.

The third stage 108 includes a transistor 146 having a base 148, a collector 150 and an emitter 152. The base 148 is connected directly to the collector load 144 so as to receive the amplified signal across the resistor 144. The collector 150 is connected to the positive supply line 46 by a resistor 154 effective to limit the maximum collector current possible through the transistor 146.

The emitter 152 is connected to ground 44 by a suitable load. The load may be of any suitable variety such as a resistor similar to the load resistor 78. Also it may be located within the amplifier or outside thereover. However, in the present instance, the load is disposed in the sensor circuit 12 and is connected to the emitter 152 by a conductor 156. It will thus be seen that the final stage 108 of the amplifier 18 will operate as an emitter follower and will match the output impedance of the amplifier 18 to the load to which the conductor 156 is connected.

The output or the junction between the emitter 152 and the conductor 156 may be interconnected with the base 124 of the second transistor 112 in the differential amplifier 104 by means of a feedback network 158. This feedback network 158 may be very similar to the feedback network 80 in the first amplifier 14. The feedback network 158 includes a pair of resistors connected directly from the emitter 152 to the base 124 to provide a complete or 100% feedback of the D.C. potential. The feedback network 158 may also includes a condenser and a series 160 of resistors that extend between ground and the junction between the first pair of resistors. In addition, a bypass condenser may be provided between the base 124 of the second transistor 112 and the junction between resistors leading to ground 44. It may thus be seen that only the portion of the A.C. signal developed across the grounded resistor will be fed back to the base 124. The magnitude of this feedback may be in the same general range as the magnitude of the feedback in the first amplifier. As a consequence, the second amplifier 18 will have the same high degree of phase and frequency stability as the first amplifier 14.

It may thus be seen that the output signal $E_a$ from the second amplifier 18 will be substantially identical to the signal $E_r$ fed into the first amplifier 14 except that its amplitude will have been increased and its phase will have been shifted. The magnitude of the phase shift will be the total of the phase shifts, if any, produced within the amplifiers 14 and 18 and the phase shift produced in the phase shifter 16. As previously pointed out, the amplifiers 14 and 18 are very stable and very linear. As a consequence, any phase shifts in these amplifiers 14 and 18 will remain constant during all operating conditions and at all frequencies. However, the amount of phase shift produced in the phase shifting network 16 and the amount of attenuation produced in the network 16 will be a function of the frequency of the signal $E_r$. As a consequence, the output signal $E_a$ on the conductor 156 will have a phase that is dependent upon the frequency.

The sensor circuit 12 includes a transformer 162 having a primary winding 164 and at least a pair of secondary windings 166 and 168 which are inductively coupled to the primary 164 by means of an iron core 170. It has been found desirable for this transformer 162 to be of a high quality variety having minimum losses and substantially uniform characteristics over the entire operating band of the amplifier 10.

One side of the primary winding 164 is connected directly to ground 44. The opposite side of the winding 164 is connected to the conductor 156 leading to the emitter 152 of the transistor 146. The interconnection between the emitter 152 and primary 164 may include an RC circuit 172 having a resistor and condenser connected in parallel with each other. The primary winding 164 will thus have the amplified and phase shifted signal $E_a$ therein.

The first secondary winding 166 is interconnected with a network 174 for providing a variable voltage $E_t$. The magnitude of this voltage $E_t$ will be effective to control the frequency at which the oscillator 10 will resonate. Accordingly, if the oscillator 10 is to be employed as a source of the variable frequency, this network 174 may include means for varying the voltage manually or automatically to produce the desired resonant frequency. However, in the present instance, it is desired to employ the oscillator 10 to measure a physical effect whereby the resonant frequency of the oscillator 10 will be a function of the physical effect. Accordingly, the network 174 includes means responsive to the physical characteristic that is to be measured whereby the voltage $E_t$ will be a function of this characteristic.

Although any suitable means may be employed for this purpose, in this embodiment a bridge type network 174 is provided. This network includes four resistors 176, 178, 180 and 182 which are interconnected with each other to form a bridge or electrical square having four separate electrical junctions 184, 186, 188 and 190. The first pair of diagonally opposite junctions 184 and 188 may be interconnected with the opposite ends of the first secondary winding 166 whereby the voltage developed within the secondary winding 166 will be applied across the bridge 174. The magnitude of this input voltage will be determined by the turns ratio between the primary 164 and secondary windings 166 and the magnitude of the voltage $E_a$ from the amplifier 18. Of course the turns ratio of the transformer 162 will remain constant. In addition, as will become apparent, the amplitude of the output signal $E_a$ will be maintained constant at all times. Therefore the magnitude of the voltage applied across this network 174 will also be constant.

The first and second sides of the bridge include two fixed resistors 176 and 178. These resistors 176 and 178 may have substantially identical resistances and by way of example, they may have resistances on the order of about 1,000 ohms each.

This third side of the bridge includes a transducing device having an impedance that is a function of the physical effect to be measured. Although this device may be of any desired variety for sensing any desired effect, by way of example, in the present instance it is a so-called resistance thermometer 180 having a large negative temperature coefficient whereby the resistance of the thermometer 180 will vary as a function of the temperature. By way of example, the thermometer may be a thermistor 180 or platinum thermometer having a resistance which is in the general range of about 100 ohms at one extreme of the temperature range to be measured. For example, if it is desired to measure the temperature of sea water, this temperature may be about 20°.

The fourth side of the bridge 174 includes a resistor 182 having a resistance effective to balance the bridge 174 when the thermistor 180 is at some particular temperature. As a practical matter, it has been found desirable for the resistance of this side to be variable. Accordingly, this side may include the first fixed resistor 182 having a resistance in the region of about 95 ohms and a potentiometer 192 in parallel therewith and having a resistance variable through a range of about 10–15 kilohms. It will thus be seen that by varying the potentiometer 192, the relative resistances of the various sides of the bridge 174 may be adjusted so that the bridge will be balanced at some particular temperature. This temperature will normally be chosen near the other extreme of the temperature range. For example if it is desired to measure the temperature of sea water, the thermistor may be maintained at some predetermined reference temperature such as 0° centigrade and then the potentiometer 192 may be adjusted so that the bridge 174 is completely balanced.

At this particular condition, irrespective of the voltage across the first pair of diagonal junctions 184 and 188, there will be zero voltage between the second pair of diagonally opposite junctions 186 and 190. However, as the temperature of the thermistor 180 varies, its resistance will vary and the bridge 174 will become unbalanced. The amount of this unbalance will be a function of the resistance of the resistance thermometer 180 such as a thermistor or platinum thermometer which, in turn, will be a function of the temperature of the thermistor 180. Since the voltage between the first pair of diagonally opposite junctions 184 and 188 will be of a constant magnitude, the voltage $E_t$ between the second pair of junctions 186 and 190 will be a function of the temperature of the thermistor 180. As a result, the voltage signal $E_t$ will normally vary through a range of X in FIGURE 5.

The second secondary winding 168 may be interconnected with a suitable phase shifting network. Although this network may be of any desired variety, for purposes of simplicity and symmetry, the second network 194 may be very similar to the first network 174. More particularly, the network 174 includes four separate impedances that are interconnected to form a bridge or electrical square having four separate junctions 196, 198, 200 and 202.

A first side of the bridge 194 may include a fixed resistor 204 which by way of example may have a resistance on the order of about 95 ohms. A second side of the bridge 194 may also include a second fixed resistor 206 which by way of example may have a resistance in the region of about 100 ohms. In order to assist in adjusting the bridge 194 to provide the desired degree of balance or unbalance, a potentiometer 208 may be disposed in parallel to this resistor 206 and have a resistance which is variable through a range of about 5–15 kilo-ohms. The potentiometer 208 is provided to vary the magnitude of the component of the voltage $E_q$ which is in phase with the voltage across the secondary winding 168. The potentiometer 208 only has a small effect on the magnitude of the component of the voltage $E_q$ which is 90° out of phase with the voltage across the secondary winding 168.

A third side may include a resistor 210 of some fixed magnitude. In addition, this side may also include a phase shifting reactance such as an inductor 212. A fourth side may include a fixed resistor 214 which may have a resistance similar to that of the resistor 210 in the third side. In addition, this side may include a phase shifting reactance such as a condenser 216 disposed in parallel to the resistor 214. It should be noted that the inductor 212 and capacitor 216 both perform the same function and normally it will only be necessary to employ one or the other of these reactances rather than both as shown.

The first pair of diagonally opposite corners 196 and 200 of this bridge 194 are interconnected with the opposite ends of the second secondary winding 168. As has been previously pointed out, the voltages produced in the primary and the secondary windings 166 and 168 will be substantially constant. As a consequence a substantially constant voltage will be impressed across the diagonally opposite corners 196 and 200 of the bridge 194. Normally once the various components in the bridge have been set they will not vary. Accordingly, a substantially constant voltage will be produced between the second pair 198 and 202 of diagonally opposite corners of the bridge 194. The magnitude of this latter voltage will be a function of the amount of unbalance and may be controlled in a course manner by the turns ratio of the secondary and in a fine manner by the setting of the potentiometer 226. As will become apparent the potentiometer 208 will be set to unbalance the bridge so that the voltage $E_q$ developed between the two diagonally opposite corners 198 and 202 will be some predetermined and constant amount.

The second pair of diagonally opposite corners 186 and 190 of the first bridge 174 may be serially interconnected with the second pair of diagonally opposite corners 198 and 202 in the second bridge 194. As a consequence, the voltages which are developed as a result of the unbalances within the two bridges 174 and 194 will be added together. As may be seen in FIGURE 5, the voltage $E_t$ developed between the first pair of junctions 186 and 190 and representing temperature will have a phase angle of 0°. The magnitude of the voltage $E_t$ will be determined by the amount of unbalance of the bridge 174 produced by the variations in the resistance of the thermistor 180. This voltage $E_t$, accordingly, will not be of a constant magnitude but will vary through some range such as "X."

Figure 5:
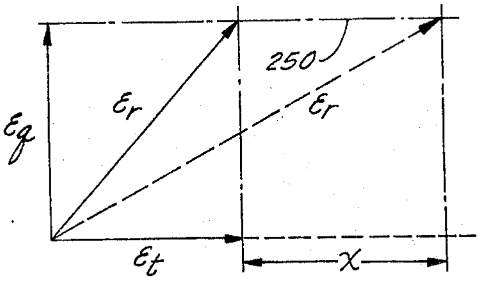
FIGURE 5 is a vector diagram of some of the signals present in the oscillator.

The voltage $E_q$ developed between the diagonally opposite corners 198 and 202 of the second bridge 194 will be a function of the turns ratio of the transformer and the setting of the potentiometer 208. Normally, the setting of the potentiometer 208 will remain constant and as a consequence the magnitude of this voltage $E_q$ will also be constant. Because of the reactance of the inductor 212 and/or of the capacitor 216, this voltage $E_q$ will have a phase angle which differs from the phase angle of the first voltage $E_t$. As seen in FIGURE 5 the phase angle may be on the order of approximately 90°.

As previously stated, the two voltages $E_t$ and $E_q$ developed within the first and second bridges 174 and 194 will be added together. Since these two voltages are out of phase with each other by an angle such as 90°, they will produce a resultant voltage $E_r$ having a phase angle somewhere between 0 and 90°. As can be seen from FIGURE 5, as $E_t$ varies over the range "X" the magnitude of the resultant voltage $E_r$ will vary. However, more importantly, the phase angle of this voltage $E_r$ will also vary. It will thus be seen that the phase angle of $E_r$ will be a function of the temperature of the thermistor 180.

The two conductors 209 and 211 from the first and second bridges 174 and 194 may be interconnected with the input to the first amplifier 14. In the present instance, the conductor 211 from the junction 190 is coupled to the junction 52 in the voltage divider by means of a condenser 222. The junction 202 in the second bridge 194 is interconnected with the ground 44 of the chassis in the first amplifier by means of the grounded conductor 209. It will thus be seen that the resultant voltage $E_r$ from the two bridge circuits 174 and 194 will be coupled to the lower half of the voltage divider and be applied to the base 30 of the first transistor 26 in the differential amplifier 20.

The foregoing circuitry forms an endless loop whereby a signal present in the loop may circulate around the loop in a clockwise direction as seen in FIGURE 1. If the gains of the two amplifiers 14 and 16 are adequate to compensate for attenuations of the circulating signal, this endless loop will oscillate at some predetermined frequency. The resultant voltage $E_r$ which is applied to the amplifier 14 will be amplified and fed to the phase shifting network 16 and then fed into and through the second amplifier 18. This amplified signal $E_a$ will have its phase shifted from that of $E_r$ by some predetermined amount. The amount of this phase shift will be primarily produced by the reactances within the phase shifter 16. Accordingly the amount of the phase shift will be a function of the frequency of the signal $E_r$. The amplified signal $E_a$ will then be fed through the sensor circuitry 12 where it will again be shifted in phase.

As previously explained in connection with FIGURE 5, the magnitude of the phase shift will be primarily a function of the resistance of the resistance thermometer such as the thermistor 180 or platinum thermometer. Accordingly, it may be seen that signals having some unique frequency will be phase shifted by the same amount in the phase shifter network 16 and in the sensor circuit 12. As a consequence, signals of this particular frequency will experience a regenerative feedback around the loop which will cause the loop to oscillate at that particular frequency. However, signals of all other frequencies will experience greater or lesser amounts of phase shift between the phase shifter network 18 and the circuit 12. As a consequence, signals of these frequencies will not regenerate and, accordingly, the oscillator 10 will not be capable of oscillating at these other frequencies.

It will, therefore, be seen that the foregoing oscillator will be effective to oscillate at a frequency which is determined by the phase angle of the resultant voltage $E_r$. The magnitude of this angle will be determined by a large number of factors, but the primary factors that determine the range will be the relative magnitude of the two voltages $E_q$ and $E_t$.

Figure 3:
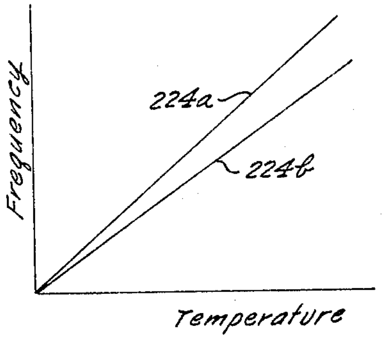
FIGURE 3 is a graph of one set of characteristics of the oscillator during one series of operating conditions.

Normally $E_q$ will remain constant while $E_t$ varies as a result of the temperature of the resistance thermometer such as thermistor 180 or platinum thermometer. Thus, as shown in FIGURE 3, the frequency will increase along a line 224 as the temperature varies. It has been found that an oscillator of this nature can be made to oscillate over a range of at least ten to one as a result of a variation in temperature of several degrees. That is, it will oscillate at a maximum frequency that is at least ten times higher than the lowest frequency at which oscillation occurs. Also, it has been found that oscillators of this nature can be made to oscillate over a range in the region of one hundred cycles per second to a range in the region of several hundred thousand cycles per second.

Figure 4:
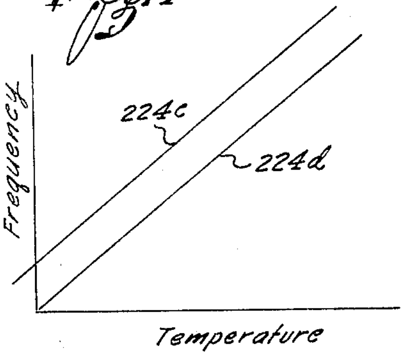
FIGURE 4 is a graph similar to FIGURE 3 but showing the characteristics during another series of operating conditions.

The slope of the frequency curve 224 will be determined by the magnitudes of the two voltages applied to the two bridges 174 and 194. Accordingly, by a proper choice of the turns ratios for the two secondary windings 166 and 168 the slope may be set at any desired angle. Although this will permit a control over the slope it has been found desirable to be able to more precisely control the slope. In order to accomplish this, a potentiometer 226 may be disposed between the two junctions 198 and 202. By varying the setting of this potentiometer 226 over a limited range the slope of the curve 224 may be made to vary through a range between the curve 224*a* and the curve 224*b*. It should also be noted that by varying the setting of the potentiometer 208 with respect to the other portions of the bridge 194, the particular temperature at which the oscillator 10 reaches the lowest frequency at which it will operate may be varied. As a consequence, as seen in FIGURE 4, the frequency curve 224 may be made to move between curve 224*c* and curve 224*d* so that it will cross the lower frequency line at any desired temperature.

It may be seen that there will be a certain amount of attenuation which will occur in the phase shifter 16 and that the magnitude of the attenuation will be a function of the frequency. In one operative embodiment of the present oscillator 10 over the entire frequency range, the attenuation within the phase shifter 16 varied from about 3 at the lower end of the range to about 6 at the upper end of the range.

In addition, a certain amount of attenuation occurs within the quadrature voltage network or second bridge 194. In the same operative oscillator 10 it was found that the amount of this attenuation was about 500 at the lower frequencies and about 330 at the upper end of the range. As a result, the total amount of attenuation around the entire loop was about 1,500 at the lower end of the frequency range and about 1,980 at the upper end of the range.

In order to maintain the loop in an oscillating mode, the total amount of gain produced by the two amplifiers 14 and 16 must exceed the total amount of attenuation. The amount of gain of the amplifiers 14 and 16 is vertually independent of the frequency even though the attenuation varies. Accordingly, if the gain obtained is adequate to produce oscillations in the regions of maximum attenuation, it will greatly exceed attenuations in other regions. As a consequence, in the region of lower attenuations the oscillations will become large enough to saturate. As a consequence, the oscillator 10 will block and fail to oscillate.

In order to overcome the foregoing difficulty, an automatic gain control 230 may be provided. In the present instance, this gain control 230 includes a third secondary winding 232 upon the transformer. This winding has a grounded center tap with the opposite ends thereof being interconnected with a pair of diodes leading to a filter network. It will thus be seen that this will operate as a full-wave rectifier 234 that will produce a D.C. potential on the line 236. This D.C. voltage will have a magnitude which is a function of the amount of voltage of the signal $E_a$ from the second amplifier 18.

The output from the rectifier 234 is interconnected with a suitable automatic gain control circuit. In the present instant this circuit is connected between the feedback network 80 and ground 44 so as to control the amount of feedback. The present circuit includes a so called field effect transistor 238. As is well known, a field effect transistor is a semiconductor device wherein the voltage of the gate will control the current flow from the source to the drain. As a consequence, the resistance between the source and the drain will be a function of the D.C. voltage between the gate and source.

The source 240 of the transistor 238 is connected directly to ground 44 while the gate 242 is connected directly to the rectifier 234 and A.C. coupled to the junction 244 between resistors 88 and 90 in the center of the feedback network 80. The drain 240 of the transistor 238 is connected to the junction 246 in the feedback network 80.

It will be seen that the effective resistance of this transistor 238 is connected in series with a portion of the feedback network 80 and in parallel with the resistor 92. It may thus be seen that as the resistance of the transistor 238 varies, the magnitude of the voltage at the junction 244 will be varied. As a consequence, the amount of signal feedback from the output of the amplifier 14 to the input of the amplifier will be controlled by the resistance of the field effect transistor 238. By a proper choice of the parameters within the amplifiers 14, the feedback network 88 and the transistor 238, it has been found that the magnitude of this feedback can be controlled so as to maintain the amplitude of the Signal $E_a$ at the output from the second amplifier 18 at a constant level 250. As a consequence, this automatic gain control circuit 230 will be effective to balance the gain of the oscillator 10 against the attenuation. Thus the oscillator 10 will always oscillate at a substantially constant amplitude. This in turn will insure that the voltage $E_a$ fed into the primary of the transformer will be constant. This in turn will further insure that the two voltages applied across the diagonally opposite junctions 184–188 and 196–200 of the two bridge circuits 174 and 194 will be constant at all times.

It will thus be seen that the present oscillator 10 may be employed to generate a signal having a frequency that varies throughout some predetermined range. Moreover, if the resistance in one side of the bridge 174 is produced by a transducer responsive to a physical effect the frequency will be an indication of the magnitude of the physical effect. For example, if the resistance in one side of the bridge 174 is provided by a thermistor or platinum thermometer 180 the frequency will be a function of the temperature of the thermistor or platinum thermometer 180. In order to measure temperature the oscillator 10 is first properly adjusted. First the temperature of the thermistor or platinum thermometer 180 is stabilized at some particular reference temperature. Normally, this temperature will be at or near one extreme of the range which it is desired to measure. For example, if it is desired to measure the temperature of sea water, the thermistor or platinum thermometer 180 may have its temperature lowered to the freezing point of water, i.e., 0° centigrade. When the thermistor is properly cooled to this temperature, the potentiometer 192 in the bridge 174 is adjusted until the bridge is completely balanced. As a consequence, even though a signal may be applied between the junctions 184 and 188, there will be no signals present between the junctions 186 and 190 at that temperature. As the temperature changes from that amount the amplitude of the output voltage $E_t$ will vary.

After the potentiometer 192 has been properly adjusted the potentiometer 208 in the bridge 194 may then be adjusted so that the bridge 194 will have the desired amount of unbalance for producing a voltage $E_q$ between the two junctions 198 and 202. As the potentiometer 208 is adjusted the line 224 will move up and down (FIGURE 4) and will be set so that the zero frequency will occur at some suitable reference temperature. After potentiometer 208 has been set, the potentiometer 226 may be adjusted so as to provide the desired amount of sensitivity. As the potentiometer 226 is adjusted the line 224 will change its slope until it is the precise amount desired. This will insure the frequency of the oscillator 10 varying precisely with the desired amount of sensitivity.

After the bridges 174 and 194 have been properly adjusted in the foregoing manner, the thermistor or platinum thermometer 180 may be disposed in intimate contact with the object having a temperature to be measured. This will then cause the thermistor or platinum thermometer 180 to assume the same temperature and have a resistance which is a function of the temperature. This, in turn, will unbalance the bridge 174 by an amount proportional to the temperature. The unbalanced bridge 174 will then provide an unbalance voltage $E_t$ between the junctions 186 and 190.

The voltage $E_t$ will be added vectorially to the voltage $E_q$ from the bridge 194 and produce a resultant voltage $E_r$. Since $E_q$ will have a constant amplitude and angle with respect to $E_t$, $E_r$ will have a phase which is a function of the resistance of the thermistor or platinum thermometer 180 and accordingly will be an indication of the temperature. The voltage $E_r$ will then be fed through the amplifier 14 where it will be amplified to a greater amplitude. This amplified signal will then be fed through the phase shifter 16 and be phase shifted by an amount which is a function of the frequency of the signal $E_r$. The shifted signal will then be fed through the amplifier 18 where it will be again amplified to produce the voltage $E_a$. The voltage $E_a$ will then be fed through the sensor circuit 12 so as to be added to the signals $E_q$ and $E_r$ developed within the bridges 174 and 194.

If the signals $E_r$ and $E_a$ are not of the right frequency, the amount of phase shifting produced in the network 16 and the bridge 194 will differ from each other. As a consequence, the vectorial sum of the two signals will be attenuated. The amount of attenuation will be greater than the gain produced by the amplifiers 14 and 18 and as a consequence, signals of these frequencies will not produce oscillations within the oscillator 10.

However, if the signals $E_a$ and $E_r$ are of a frequency wherein the phase shift in the network 16 is equal to the phase shift produced by the vectorially adding $E_q$ and $E_t$ the amplitudes of the two signals will add directly to each other. As a consequence, the amount of attenuation of signals of this frequency will be less than the gain from the amplifiers 14 and 18. As a consequence of this regenerative feedback around the loop, the entire oscillator 10 will oscillate at this frequency. Since the frequency of oscillation will be determined by the phase angle of $E_r$, the frequency of these oscillations will be a function of the temperature of the thermistor 180.

In the event the amplitudes of the various signals $E_a$ and $E_r$ tend to vary due to variations in the attenuation produced within the network 16 and sensor circuit 12, there will be corresponding fluctuations in the D.C. voltage present on the output line 236. This D.C. voltage will be effective to vary the resistance of the field effect transistor 238. This in turn will control the amount of feedback through the network 80 in amplifier 14 to maintain the overall gain of the oscillation substantially equal to or slightly greater than the overall attenuation.

It may thus be seen that the frequency of the oscillations will be indicative of the temperature of the thermistor 180. In order to sense this frequency, an output lead such as 250 will be connected across the primary 164 so that a signal having a frequency equal to the resonant frequency of the oscillator may be supplied to a suitable frequency meter which is calibrated to indicate the temperature.

While only a single embodiment of the present invention is disclosed and described herein, it will be readily apparent to persons skilled in the art that numerous changes and modifications may be made without departing from the scope of the invention. Accordingly, the foregoing disclosure and description thereof are for illustrative purposes only and do not in any way limit the invention which is defined only by the claims which follow.

What is claimed is:

1. In an oscillator of the class described, the combination of:

amplifying means effective to amplify an electrical signal, phase shifting means interconnected with said amplifying means for shifting the phase of said amplified signal, said phase shifting means being responsive to the frequency of said signal for shifting the phase of said signal through an angle dependent upon the frequency of said signal, first means interconnected with said amplifying means and said phase shifting means and including a first bridge and first inductively reactive means connected to the first bridge to produce a first signal having a particular amplitude, second means interconnected with the first means and the amplifying means and the phase shifting means and including a second bridge and second inductively reactive means connected to the second bridge and magnetically coupled to the first inductively reactive means to produce a second signal having a variable amplitude and a fixed phase difference from said first signal, means interconnected with said last means to combine said first and second signals to produce a resultant signal having a phase angle that is substantially equal to the phase shift produced in said phase shifting means at the frequency of the amplified signal introduced to the phase shifting means, and a gain control operatively interconnected with said amplifying means for controlling the gain provided by said amplifying means to maintain the amplitude of said amplified signal substantially constant.

2. In combination in an oscillator:

first means including a phase shifter operative to shift the phase of a signal in accordance with the frequency of said signal, second means interconnected with said first means and including a first bridge and first inductively reactive means connected to the first bridge to produce a first signal having a particular amplitude and further including a second bridge interconnected with the first bridge and also including second inductively reactive means connected to the second bridge and magnetically coupled to the first inductively reactive means to produce a second signal having a variable amplitude and a fixed phase difference from said first signal, third means interconnected with said second means to combine said first and second signals to produce a resultant signal having a phase angle that is substantially equal to the phase shift produced in said phase shifting means at the frequency of the signal introduced to the phase shifting means, means connected to the first and third means to introduce the resultant signal from the third means to the first means for use as the signal to be shifted in phase by the first means, and means operatively interconnected with said phase-shifting means and responsive to the amplitude of the resultant signal to maintain the amplitude of said phase-shifted signal substantially constant.

3. In combination in an oscillator:

a differential amplifier having a pair of sides each connected to receive an individual signal, the differential amplifier being effective to amplify the difference between the signals introduced to said sides and produce an amplified signal having characteristics representing such difference, phase shifting means interconnected with said differential amplifier for shifting the phase of said amplified signal, said phase shifting means being responsive to the frequency of said amplified signal for shifting the phase of said amplified signal by an angle dependent upon the frequency of said signal, first means connected to said phase shifting means to produce a first signal having a particular amplitude and a second signal having a variable amplitude and a fixed phase difference from said first signal, second means interconnected with said first means to produce a resultant signal having a phase angle that is substantially equal to the phase shift produced in said phase shifting means at said frequency of said amplified signal, said second means being interconnected with one side of said differential amplifier to feed said resultant signal to said side for amplification of the difference between this signal and the signal introduced to the other side, and feedback means interconnected with the output from said amplifier means to feed a portion of the amplified signal from said amplifier back to the other side of said amplifier means.

4. In combination in an oscillator:

a differential amplifier having a pair of sides each connected to receive an individual signal, the differential amplifier being effective to amplify the difference between the signals introduced to said sides to produce an amplified signal representing said difference, phase shifting means interconnected with said differential amplifier for shifting the phase of said amplified signal, said phase shifting means being responsive to the frequency of said amplified signal for shifting the phase of said signal by an angle dependent upon the frequency of said signal, first means connected to said phase shifting means to produce a first signal having a particular amplitude and a second signal having a variable amplitude and a fixed phase difference from said first signal, second means interconnected with said first means to produce a resultant signal having a phase angle that is substantially equal to the phase shift produced in said phase shifting means at said frequency of said amplified signal, said second means being interconnected with one side of said differential amplifier to feed said resultant signal to said side for the production of the amplified signal by the amplifier, feedback means interconnected with said differential amplifier to feed the amplified signal from said amplifier back to the amplifier to control the gain of the amplifier and means interconnected with said feedback means and to said second means and responsive to at least one of said resultant and amplified signals to vary the signal feedback to the differential amplifier to maintain the amplitude of said amplified signal substantially constant.

5. In combination in an oscillator:

a differential amplifier having a pair of sides each connected to receive an individual signal, the differential amplifier being effective to amplify the difference between the signals introduced to said sides, phase shifting means interconnected with said differential amplifier for shifting the phase of said amplified signal by an angle dependent upon the frequency of said amplified signal, first means connected to said phase shifting means to produce a first signal having a particular amplitude and a second signal having a variable amplitude and a fixed phase difference from said first signal, second means interconnected with said first means to produce a resultant signal having a phase angle that is substantially equal to the phase shift produced in said phase shifting means at said frequency of said amplified signal, said second means being connected to one side of said differential amplifier to feed said resultant signal to said side, a resistive feedback network connected to said differential amplifier, said network having a section interconnected with the other side of said differential amplifier to feed the amplified signal from said amplifier back to said other side of said amplifier means, variable resistance means interconnected with said network, the resistance of said resistance means being effective to control the amplitude of said feedback signal, and means interconnected with said variable resistance means and responsive to the amplitude of at least one of said amplified and resultant signals to vary the resistance of said variable resistance means to maintain the amplitude of said amplified signal substantially constant.

6. Apparatus for measuring the magnitude of a physical effect and producing an electrical signal having a frequency that is dependent upon said magnitude, said apparatus including the combination of:

first means for shifting the phase of electrical signals by an amount which is dependent upon the frequency of said signals, second means interconnected with said first means and including first bridge means and first inductively reactive means connected to produce a first signal having a predetermined amplitude and further including second bridge means and second inductively reactive means magnetically coupled to the first inductively reactive means and connected to produce a second signal having a variable amplitude and a fixed phase difference from said first signal, a transducer interconnected with said last means and being disposed in responsive relation with said physical effect, said transducer being effective to vary the amplitude of said second signal in response to the magnitude of said effect, third means interconnected with said second means to produce a resultant signal having a variable phase which is dependent upon the amplitude of said variable amplitude signal relative to said fixed amplitude signal, and means interconnecting said third means with said first means to feed said resultant signal to said first means to produce an alternating signal having a frequency dependent upon the phases provided by said first and third means.

7. Apparatus for measuring variations in the characteristics of a physical effect and producing an electrical signal having a frequency that is dependent upon said characteristics, said apparatus including the combination of:

first means for shifting the phase of an electrical signal by an angle which is dependent upon the frequency of said signals, second means interconnected with said first means and including a first bridge and first inductively reactive means connected to the bridge and responsive to the signal from the first means to produce a first signal having a particular amplitude, third means interconnected with said first means and including a second bridge connected to the first bridge and further including second inductively reactive means connected to the second bridge and magnetically coupled to the first inductively reactive means to produce a second signal having a fixed phase difference from said first signal, a transducer electrically disposed in said second means and having a variable impedance and physically responsive to said physical effect to provide a variable impedance in accordance with the variations in the characteristics of the physical effect to vary the amplitude of said second signal in accordance with such variable impedance, and means interconnected with said second and third means to produce a resultant signal having a phase which is dependent upon the amplitude of said second signal relative to the amplitude of said first signal, said last means being interconnected with said first means to feed said resultant signal to the first means to obtain variations in the frequency of the signal passing through the first means.

8. Apparatus for measuring variations in the characteristics of a physical effect to produce an electrical signal having a frequency dependent upon the variations in such characteristics, said apparatus including the combination of:

first means for shifting the phase of said electrical signal by an angle which is dependent upon the frequency of said signal, second means interconnected with said first means and including first inductively reactive means to receive the phase-shifted signal from said first means and to produce a first signal having a particular amplitude, bridge circuit means electrically connected to provide two pairs of diagonally opposite corners, one pair of said corners being connected to said first means to receive said phase-shifted signal, the other pair of said corners being effective to provide a second signal having a fixed phase difference from said first signal, a transducer electrically interconnected within said bridge and having a variable impedance physically disposed relative to said physical effect to provide variations in the impedance in accordance with variations in the characteristics of said physical effect, said transducer being included in said bridge circuit means to vary the amplitude of said second signal in accordance with the variations in the impedance of said transducer, means interconnecting said second means and the other pair of corners in said bridge to produce a resultant signal having a phase which is dependent upon the amplitude of said second signal relative to the amplitude of said first signal, and means interconnecting said last means with said first means to feed said resultant signal to said first means to vary the frequency of the electrical signal.

9. Apparatus for measuring variations in the characteristics of a physical effect to produce an electrical signal having a frequency that is dependent upon such characteristics, said apparatus including the combination of:

first means for shifting the phase of said electrical signal by an angle which is dependent upon the frequency of said signal, a first bridge having two pairs of diagonally opposite corners, one of said pairs of corners being interconnected with said first means to receive said phase-shifted signal, the other of said pairs of corners being effective to produce a first unbalance signal having a particular amplitude, a second bridge having two pairs of diagonally opposite corners, one of said pairs of corners being interconnected with said first means to receive said phase-shifted signal, the other of said pairs of corners being effective to produce a second unbalance signal having a particular phase relative to the first signal and having a variable amplitude, second means in the second bridge and responsive to the variations in the characteristics of said physical effect to vary the amplitude of the second signal, third means interconnecting the second corners in each of said first and second bridges to produce a resultant signal having a variable phase which is dependent upon the amplitude of said second signal relative to the amplitude of said first signal, and fourth means interconnecting said third means and said first means to feed said resultant signal to said first means to vary the frequency of the electrical signal in accordance with the phase of the resultant signal.

10. Apparatus for measuring variations in the characteristics of a physical effect to produce an electrical signal having a frequency that is dependent upon the characteristics of said physical effect, said apparatus including the combination of:

means for shifting the phase of said signal by an angle which is dependent upon the frequency of said signal, a first bridge having two pairs of diagonally opposite corners, one of said pairs of corners being interconnected with said first means to receive said phase-shifted signal, the other of said pairs of corners being effective to produce a first unbalance signal having a particular amplitude, a second bridge having two pairs of diagonally opposite corners, one of said pairs of corners being interconnected with said first means to receive said phase-shifted signal, the other of said pairs of corners being effective to produce a second unbalance signal having a particular phase shift relative to the first unbalance signal and having a variable amplitude, a reactance being included in the first bridge to provide the particular shift in the phase of the second unbalance signal from the phase of the first unbalance signal from the first bridge by a predetermined amount, a transducer electrically disposed in the second bridge and having a variable impedance for varying the amplitude of the second signal in accordance with the variations in impedance, said transducer being disposed relative to said physical effect to provide variations in impedance in accordance with the variations in the characteristics of the physical effect, means interconnected with the second corners of said first and second bridges to produce a resultant signal having a phase which is dependent upon the amplitude of said second unbalance signal relative to the amplitude of said first unbalance signal, and means interconnecting said last mentioned means and said first means to feed said resultant signal to said first means to vary the frequency of the electrical signal.

11. Apparatus for measuring variations in the characteristics of a physical effect to produce an electrical signal having a frequency that is dependent upon such variations in said characteristics, said apparatus including the combination of:

first means for shifting the phase of said electrical signal by an angle which is dependent upon the frequency of said signal, a first bridge having four separate sides electrically interconnected to form two pairs of diagonally opposite corners, one of said pairs of corners being interconnected with said first means to receive said phase-shifted signal, the other of said pairs of corners being effective to produce a first unbalance signal having a particular amplitude, second means in one of the sides of said bridge and having an impedance variable through a particular range to control the amount of unbalance in said bridge and the magnitude of said first unbalance signal in accordance with the variations in the impedance, a second bridge having four separate sides electrically interconnected to form two pairs of diagonally opposite corners, one of said pairs of said corners being interconnected with said first means to receive the phase-shifted signal, the other of said pairs of corners effective to produce a second unbalance signal, third means in the first bridge to shift the phase of the first unbalance signal from the phase of the second unbalance signal by a particular angle, a transducer having a variable impedance and electrically disposed in one side of said second bridge to provide variations in the amplitude of the second signal in accordance with variations in its impedance, the transducer being disposed relative to said physical effect to provide variations in its impedance dependent upon the variations in the characteristics of said physical effect, fourth means interconnected with the others of the pairs of corners in said first and second bridges to produce a resultant signal having a phase which is dependent upon the amplitude of said second signal relative to the amplitude of said first signal, fifth means interconnecting said fourth means and said first means to feed said resultant signal to said first means to obtain oscillations at a frequency dependent upon the phase of the resultant signal, and means included in said second means to vary the magnitude of said first unbalance signal relative to the magnitude of the second unbalance signal to provide a particular frequency for said oscillations when said impedance of said transducer is equal to a particular value.

12. Apparatus for measuring variations in the characteristics of a physical effect to produce an electrical signal having a frequency dependent upon the variations in such characteristics, said apparatus including the combination of:

first means for shifting the phase of said electrical signal by an angle dependent upon the frequency of said electrical signal, a first bridge having four sides electrically interconnected to form two pairs of diagonally opposite corners, one of said pairs of corners being interconnected with said first means to receive said phase-shifted signal, the other of said pairs of corners being effective to produce a first signal having a particular amplitude, a variable resistance interconnected between said second pairs of corners in the first stage, a second bridge having four sides electrically interconnected to form two pairs of diagonally opposite corners, one of said pairs of said corners being interconnected with said first means to receive said phase-shifted signal, the other of said pairs of corners being effective to produce a second signal, second means in the first bridge for shifting the phase of the first signal from the phase of the second signal by a particular angle, a transducer having a variable impedance and electrically disposed in one side of said second bridge to vary the amplitude of the second signal in accordance with variations in its impedance, the transducer being disposed relative to said physical effect to provide variations in its impedance in accordance with the variations in the characteristics of the physical effect, third means interconnected with the second pairs of corners in said first and second bridges to produce a resultant signal having a phase dependent upon the amplitude of said second signal relative to the amplitude of said first signal, said variable resistance being effective to vary the amplitude of the first signal to cause the phase of said resultant signal to vary at a particular rate with variations in the impedance of the transducer, and fourth means interconnecting said third means with said first means to feed said resultant signal to the first means to vary the frequency of the electrical signal in accordance with the variations in the phase of the resultant signal.

13. A variable frequency oscillator, including the combination of:

means for shifting the phase of an electrical signal by an angle dependent upon the frequency of said signal, a transformer having a primary winding and a pair of secondary windings, said primary winding being interconnected with said first means to receive said phase-shifted signal and to induce the phase-shifted signal in each of said secondary windings, a first bridge having four separate sides interconnected with each other to form two pairs of diagonally opposite corners, one of said pairs of corners being connected to one of said secondary windings to receive the phase shifted signal from the secondary winding, the impedances of said sides of said bridge being unbalanced to produce a first unbalance signal between the other pairs of corners in the bridge, a second bridge having four separate sides interconnected with each other to form two pairs of diagonally opposite corners, one of said pairs of corners in said second bridge being interconnected with the other of said secondary winding to receive the phase-shifted signal from that secondary winding and produce a second unbalance signal between the other pairs of corners, means in at least one of said sides of the first bridge for maintaining a particular phase angle between the first and second unbalance signals, means in at least one of said sides of the second bridge to vary the amplitude of the second unbalance signal relative to the amplitude of the first unbalance signal, and means interconnecting the other pairs of corners in said first and second bridges with each other and said first means to produce a resultant signal and to feed said resultant signal to said first means to vary the frequency of the electrical signal in accordance with variations in the phase of the resultant signal.

14. Apparatus for measuring variations in the characteristics of a physical effect to produce an electrical signal having a frequency that is dependent upon the variations in the characteristics, said apparatus including the combination of:

first means for shifting the phase of said electrical signal by an angle which is dependent upon the frequency of said signal, a transformer having a primary winding and a pair of secondary windings, said primary winding being connected to said first means and inductively coupled to said secondary windings to induce the phase-shifted signal in the secondary windings, a first bridge having four separate sides electrically interconnected to form two pairs of diagonally opposite corners, one of said pairs of corners being interconnected with one of said secondary windings to receive the phase-shifted signal, the other of said pairs of corners being effective to produce a first unbalance signal having a particular amplitude, second means in one of the sides of said first bridge and having an adjustable impedance to control the amount of unbalance in said first bridge and the amplitude of said first unbalance signal, a second bridge having four separate sides electrically interconnected to form two pairs of diagonally opposite corners, one of said pairs cf said corners being interconnected with the other of said secondary windings to receive the phase-shifted signal, the other of said pairs of corners being effective to produce a second unbalance signal, third means in the first bridge for shifting the phase of the first unbalance signal from the phase of the second unbalance signal by a predetermined angle, a transducer electrically disposed in one side of said second bridge and having a variable impedance and being disposed relative to said physical effect to provide variations in its impedance in accordance with the variations in the characteristics of the physical effect and to vary the amplitude of the second unbalance signal in accordance with the variations in the impedance, fourth means interconnected with said others of said pairs of corners in the first and second bridges to produce a resultant signal having a phase dependent upon the amplitude of said second unbalance signal relative to the amplitude of said first unbalance signal, fifth means interconnecting said fourth means and said first means to feed said resultant signal to said first means to obtain for said electrical signal a frequency dependent upon the phase angle of the resultant signal, and said second means being effective to vary the magnitude of the second unbalance signal whereby the frequency of said electrical signal will have a particular value when said impedance of said transducer has a particular value.

References Cited by the Examiner

UNITED STATES PATENTS

| | | | |
|---|---|---|---|
| 2,782,311 | 2/1957 | Colander et al. ------ | 331—138 |
| 2,923,893 | 2/1960 | Runyan ------------ | 331—140 |

ROY LAKE, *Primary Examiner.*

S. H. GRIMM, *Assistant Examiner.*